United States Patent [19]

Burgyan et al.

[11] 3,773,535

[45] Nov. 20, 1973

[54] ABRASION RESISTANT STABILIZED LEAD CHROMATE PIGMENTS COATED WITH SILICA AND POLYOLEFIN WAX

[75] Inventors: Aladar Burgyan, Cleveland; Richard A. Pipoly, Garfield Heights; Paul H. Stelzer, Warrensville, all of Ohio

[73] Assignee: Ferro Corporation, Cleveland, Ohio

[22] Filed: Feb. 25, 1972

[21] Appl. No.: 229,512

[52] U.S. Cl.......... 106/298, 106/308 M, 106/308 Q
[51] Int. Cl................................................ C09c 1/20
[58] Field of Search........... 106/308 M, 298, 308 Q; 117/92

[56] References Cited
UNITED STATES PATENTS

| | | | |
|---|---|---|---|
| 3,462,390 | 8/1969 | Dunn | 260/41 |
| 3,470,007 | 9/1969 | Linton | 106/298 |
| 3,586,247 | 6/1971 | Perrins | 241/16 |
| 3,607,337 | 9/1971 | Eisenmenger et al. | 106/288 Q |
| 3,639,133 | 2/1972 | Linton | 106/298 |

Primary Examiner—James E. Poer
Assistant Examiner—S. Berger
Attorney—Solon B. Kemon et al.

[57] ABSTRACT

Lead chromate pigments are improved by coating the pigment particles with a layer of silica and then encapsulating the silica coated particles in polyolefin wax. Such pigments when used in thermoplastic molding compositions exhibit good abrasion resistance and color stability even at elevated temperatures required for compounding and molding of the thermoplastics.

11 Claims, No Drawings

ABRASION RESISTANT STABILIZED LEAD CHROMATE PIGMENTS COATED WITH SILICA AND POLYOLEFIN WAX

BACKGROUND OF THE INVENTION

1. Field of the Invention

This invention relates to the manufacture of chromate pigments having improved abrasion resistance and color stability. More particularly, it concerns lead chromate pigments that retain high tinctorial values even under adverse heat and abrasion conditions encountered in the compounding and molding of thermoplastic materials.

2. Description of the Prior Art

Lead chromate pigments are widely used for coloring many types of products because they are inexpensive and have good tinctorial qualities. The term "lead chromate pigments" is understood in the trade to include all pigments in which lead chromate is a major ingredient. Such pigments range from relatively pure lead chromate of rhombic crystal form in shades known as "Primrose Yellow" or monoclinic crystal form in shades known as "Medium Yellow" to solid solutions of lead chromate and lead sulfate or lead molybdate in shades of orange or yellowish reds known as "Molybdate Oranges" and "Molybdate Reds." This invention pertains to all pigments encompassed by such construction of the term lead chromate pigments.

Lead chromate pigments have several deficiencies that are particularly troublesome in their use for coloring of thermoplastic resins. In the compounding of compositions from such resins and the extrusion or molding of articles from the compositions, severe abrasion and heat conditions are imposed upon the ingredients of the compositions. When lead chromate pigments are used in such compositions, the abrasion and heat tend to seriously degrade the color qualities of the pigments. Color degradation of the pigments due to heat can be mitigated by coating the pigments with silica (see U.S. Pat. No. 2,296,638) or with dense alumina modified silica (see U.S. Pat. Nos. 3,370,971 and 3,470,007). Such treatment of the pigments may suffice for some uses of them, but when they are used for coloring of thermoplastic resins this is insufficient to preserve good color stability. The abrasion of the pigment particles serves to degrade the pigment color to an undesirable degree. The effectiveness of lead chromate pigments for the coloring of thermoplastic resins would be improved if their abrasion resistance and heat color stability could be increased without detriment to their tinctorial value or other desired qualities.

OBJECTS

A principal object of this invention is the production of lead chromate pigments having improved abrasion resistance and color stability. Further objects include the provision of:

1. Lead chromate pigments that are more heat stable than related pigments now available.
2. New methods for the manufacture of lead chromate pigments.
3. Lead chromate pigments having improved properties that make them particularly useful for the coloring of thermoplastic resins.
4. Lead chromate pigment color production processes capable of stabilizing even the most inexpensive pigments.
5. Methods for the encapsulation of silica coated lead chromate pigments.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description. It should also be understood the foregoing abstract of the disclosure is for the purpose of providing a non-legal brief statement to serve as a searching-scanning tool for scientists, engineers and researchers and is not intended to limit the scope of the invention as disclosed herein nor is it intended it should be used in interpreting or in any way limiting the scope or fair meaning of the appended claims.

SUMMARY OF THE INVENTION

These objects are accomplished according to the invention by the manufacture of lead chromate pigments comprising the steps of (1) depositing on pigment particles a coating of silica in an amount between about five to 50 percent of the total combined weight of pigment and silica and then (2) encapsulating the silica coated pigment particles in polyolefin wax with the amount of wax being between about 10 to 70 percent of the total weight of the resulting product.

The step of depositing the silica coating upon the pigment particles is advantageously accomplished by simultaneously mixing together an aqueous slurry of lead chromate pigment, an aqueous solution of sodium silicate and an aqueous acid solution containing sufficient hydrogen ions to convert the sodium silicate into silica thereby uniformly precipitating upon the pigment particles a coating of silica. The silica coated particles are then separated from the resulting slurry in any suitable manner, preferable by filtration.

The step of encapsulating the silica coated pigment particles in polyolefin wax is advantageously accomplished by homogeneously mixing together silica coated pigment obtained as described above with molten polyolefin wax, cooling the resulting mix to a solid mass and then pulverizing the solid mass. Alternatively, such encapsulation can be accomplished by mixing a slurry of water and the silica coated pigment with an emulsion of the polyolefin wax, then precipitating wax from the emulsion upon the slurry pigment particles and subsequently recovering the encapsulated pigment particles such as by filtration. Alternative methods for the encapsulation step involve vacuum deposition of polyolefin wax upon silica coated pigment particles or by mixing together silica coated pigment particles obtained as previously described with an organic solution of polyolefin wax followed by evaporation of solvent from the resulting slurry.

Success of the present invention is due, at least in part, to the discovery that silica coated lead chromate pigments have substantially improved stability when encapsulated in a protective coat of polyolefin wax. It has also been discovered that such wax encapsulation of the pigment particles substantially improves the abrasion resistance of the pigment. Accordingly, pigments of the invention are particularly useful for coloring thermoplastic resins because they exhibit relatively high degree of tinctorial value even when subjected to the abrasion and heat normally encountered in the compounding and molding of thermoplastic resins.

DESCRIPTION OF PREFERRED EMBODIMENTS

The following details of operations in accordance with the invention and reported data illustrate the further principles and practice of the invention to those skilled in the art. In these examples and throughout the remaining specification and claims, all parts and percentages are by weight unless otherwise specified.

Example 1

Preparation of Abrasion Resistant Color Stabilized Chrome Yellow Pigment.

A slurry was made from 100 parts of commercially available chrome yellow pigment ("Hick's 115") and 667 parts water in a reaction vessel equipped with internal stirrer and external heating jacket. While the slurry was moderately and continuously agitated at 95°–100° C, 80 parts of sodium silicate solution (28% $SiO_2$; $SiO_2/Na_2O$ ratio 3.28) dissolved in 800 parts of water and 14.0 parts ammonium sulfate dissolved in 530 parts of water were slowly and simultaneously added streamwise over a period of 3 hours. The resulting slurry was stirred for 30 minutes with continued heating at 95°–100° C and then 66.7 parts of an emulsion (designated PEW No. 1) composed of the following ingredients were added:

polyethylene wax (1,000 mol. wt.) — 400 parts
emulsifying agent (nonionic) — 100 parts
potassium hydroxide — 7 parts
water — 1,370 parts The slurry containing the added emulsion was stirred for 15 minutes and then 10 percent sulfuric acid was added streamwise until the slurry reached a pH of 2.0. After 15 minutes of further stirring, the slurry was filtered, the filtrate was discarded and the filtercake was washed thoroughly with water. The cake was then removed from the filter, oven dried and powdered.

The emulsion used in this operation was prepared from a polyolefin wax commercially available as "Epolene E-43" and the emulsifying agent was a polyethylene glycol ether of linear alcohol commercially available as "Teritol 15-S-9." The emulsion was prepared by placing the ingredients in a pressure vessel equipped with internal, marine-type stirrer and external heating jacket. The vessel contents were heated with gentle agitation to 90°–95° C at which time the vessel was pressure sealed and the degree of agitation substantially increased. Heating was increased to raise the vessel contents to 140°–145° C and this was held with the continued vigorous agitation for about 1 hour. Then heating was stopped, agitation was reduced to gentle level and the vessel contents allowed to cool to 45° C. The vessel was then unsealed and the resulting emulsion conveyed to storage for future use.

Example 2

The procedures of Example 1 where repeated except that 80 parts of a second emulsion (designated PEW No. 2) was substituted for PEW No. 1 of Example 1. This second emulsion consisted of the following ingredients:

Polyethylene wax (1,800 mol. wt.) — 40 parts
tall oil fatty acids (TOFA) — 7 parts
morpholine — 7 parts
water — 150 parts (The polyethylene wax was a commercial product designated "Epolene E-14").

The emulsion was prepared by melting and mixing together the polyethylene wax and TOFA in a first open vessel equipped with internal stirrer. With the temperature adjusted to 115° C, the morpholine was added streamwise and stirred into the molten wax and TOFA mixture. The water was heated in a second agitator equipped vessel to 95°–97° C and the contents of the first vessel were slowly poured into the heated water. Rapid emulsification occurred and stirring was continued until the O/W emulsion cooled to 45° C.

Example 3

The procedure of Example 2 was repeated except 76.9 parts of an emulsion designated PEW No. 3 was substituted for the 80 parts of PEW No. 2. This emulsion was made by the same procedure as for PEW No. 2 using the following ingredients:

Polyethylene was (3,000 mol. wt.) — 40 parts
tall oil fatty acids — 7 parts
morpholine — 7 parts
water — 103 parts (The polyethylene wax was commercially available as "Epolene E-10").

Example 4

Testing of Pigments Exs. 1–3

Tests were performed to evaluate the abrasion resistance and color stability on heating of the pigments prepared in Examples 1–3. First, for each separate pigment, one part was added to 99 parts of powdered polystyrene of injection molding grade in a container and the container was capped. This was then placed in a paint shaker and shaken for 1.0 minute. The pigmented polystyrene powder was then removed from the container and divided into two portions. One portion (designated A) was injection molded into standard rectangular test chips at an injection temperature of 250° C and a dwell time of 5 seconds. The second portion (designated B) was injection molded in the same equipment into test chips at an injection temperature of 290° C and a dwell time of 180 seconds. The various chips were then examined for color difference values. This was preformed in a Hunter Model D-25 difference meter to measure "$L$" (reflectance or lightness based on a MgO standard), "$a$" (redness) and "$b$" (yellowness). Measurements so made are then used to determine total color difference $\Delta E$ according to the equation:

$$\Delta E = \sqrt{L^2 + a^2 + b^2}$$

where $\Delta L$, $\Delta a$ and $\Delta b$ are the difference, between the values of $L$, $a$ and $b$ for two sets of chips A and B for each pigment. The results of these tests are reported in the following table.

TABLE I

| Pigment | L | a | b | $\Delta E$ |
|---|---|---|---|---|
| PEW No. 1A | 35.74 | 54.46 | 23.10 | |
| PEW No. 1B | 33.20 | 49.56 | 21.80 | 5.67 |
| PEW No. 2A | 35.42 | 54.70 | 23.20 | |
| PEW No. 2B | 33.62 | 50.71 | 22.14 | 4.50 |
| PEW No. 3A | 35.94 | 54.98 | 23.36 | |
| PEW No. 3B | 33.32 | 50.14 | 21.74 | 5.74 |
| Control A | 35.20 | 52.34 | 23.20 | |
| Control B | 32.18 | 45.70 | 21.03 | 7.61 |

In Table I, the items "Control A" and "Control B" are values for test chips molded from pigment made according to Example 1 but in which no polyethylene wax emulsion was used, i.e., only the silica coating was applied and then the pigment was recovered by filtration from the slurry, washed, dried and powdered.

The data of Table I show that the encapsulation of silica coated lead chromate pigments in accordance with the invention improves the ability of silica coated pigment to preserve tinctorial properties under adverse heat and mechanical working conditions better than the silica coated pigments that do not have such polyethylene wax encapsulation.

Example 5

A mixer equipped with high speed shear-type agitator and heating jacket was charged with 45 parts of polyethylene wax (2,000 mol. wt.). The wax was heated to melting and then 55 parts of silica coated primrose yellow lead chromate pigment were mixed into the molten wax. This mixture was solidified by cooling to ambient temperature. The solid mass was broken into pieces and these were pulverized so as to pass a 40 mesh standard sieve.

To test the color stability to heating of the pigment obtained as described above, one part of it was mixed in a shaker mixer with 99 parts of polystyrene molding powder and then color test chips were injected molded from the mixture at 290° C for dwell times of 3 min. and 5 min. This procedure was repeated with untreated pigment to provide control comparison test chips. The $\Delta E$ values obtained by color difference measurements as described in Example 4 comparing the chips to standard chips molded at 250° C for 5 seconds are reported in the following table.

TABLE II

|  | 3 min. dwell | 5 min. dwell |
|---|---|---|
| Treated Pigment | 0.72 | 4.29 |
| Untreated Pigment (Hicks No. 115) | 20.80 | 26.51 |

These data show the treated pigment to have much improved heat stability in thermoplastic molding operations.

To test abrasion resistance of the polyethylene wax encapsulated pigment, three portions of one part pigment to 99 parts polystyrene molding powder were mixed in a shaker mixer for 1 min., 3 min. and 10 min. respectively. Test chips were molded of these mixtures at 290° C and dwell time of 3 minutes. Again $\Delta E$ values were determined for the resulting chips molded at 250° C and dwell time of 5 seconds. The resulting data are reported in the following table.

TABLE III

| Shaking Time | $\Delta E$ Wax-Treated Pigment | $\Delta E$ Wax-Untreated Pigment |
|---|---|---|
| 1 min. | 0.72 | 7.61 |
| 3 min. | 1.03 | 14.0 |
| 10 min. | 4.59 | 20.9 |

These data show the wax-treated treated pigment to be much improved in abrasion resistance as compared to the wax-untreated pigment.

Example 6

A slurry was made by mixing 50 parts of silica coated medium red lead molybdate pigment (made according to the procedure of Example 1 from "Hicks 239") with 750 parts water. The slurry was heated to 90°–95° C and 100 parts of a 15 percent O/W emulsion of polyethylene wax (1,500 mol. wt.) was stirred into the heated slurry. After stirring for 15 minutes, the mixture was acidified with 10 percent sulfuric acid to a pH of 2 and the acidified slurry was spray dried. Tests on polystyrene molded chips conducted as in Example 5 showed the heat and abrasion resistance of the resulting pigment to be comparable to that of the Example 5 pigment.

Example 7

Yellow, silica coated, lead chromate pigment made according to the procedure of Example 1 and polyethylene wax (commercially available as 617 A) were charged at a pigment to wax weight ratio of 10:6 into a high speed screw mixer extruder. The extruder operating at a barrel temperature of about 120° C formed a homogeneous mixture of the pigment and wax which issued as a hot sheet from the extruder. This sheet was passed directly to a double roll cooler which cooled the sheet to about 20°–30° C. The cooled sheet was then passed to a sheet breaker which transformed it into broken pieces of about 5 sq. cm. or smaller. These pieces were conveyed to a micropulverizer that turned them into a coarse powder. This, in turn, was conveyed to a vibrating screener that separated the powder into a main portion that would pass 40 standard mesh screen and a minor portion that would not pass. The minor portion was recycled to the micropulverizer.

The resulting wax encapsulated pigment was evaluated, in comparison with the wax-untreated silica coated pigment, for color stability using the injection molded color chip procedure as described in Example 4. This produced the following data:

Silica-coated pigment (control) — $\Delta E$(avg.) = 7.61
Wax encapsulated pigment — $\Delta E$(avg.) = 1.72

The procedures described above were repeated with an orange colored pigment (Hicks 239 molybdate orange). This resulted in the following data:

Silica-coated pigment (control) — $\Delta E$(avg.) = 12.9
Wax encapsulated pigment — $\Delta E$(avg.) = 2.45

DISCUSSION OF DETAILS

The foregoing description of preferred embodiments demonstrates that the methods of the invention may be applied to a variety of lead chromate pigments. The invention is contemplated for use with all pigments encompassed by such trade designation as previously discussed.

The first stage of operation in the new methods is the provision of silica-coated lead chromate pigment. Such pigments are commercially available and may be used in carrying out the methods of the invention. Alternatively, uncoated lead chromate pigments may be silica-coated properly for the purposes of the invention in a variety of ways. One preferred method is to deposit a dense silica coat on the pigment with a simultaneous strike of sodium silicate and sulfuric acid or ammonium sulfate. The resulting product is washed free of sulfate and dried. This basic operation may be modified by inclusion of other components in the silica-coating, variation in strike temperature or strike time, etc. Alternative methods are described, for example, in U.S. Pat. Nos. 3,370,971 and 3,407,007 which are incorporated herein by reference. The silica-coating, of whatever variation, is conducted to produce a silica-coating in which the weight of silica amounts to between about five to 50 percent of the total combined weight of pigment and silica.

The second stage of operation of the new methods is the encapsulation of the silica-coated pigment with polyolefin wax. This may be accomplished in several ways so as to encapsulate the pigment particles in polyolefin wax amounting to between about 10 to 70 percent of the total combined weight of silica-coated pigment and wax.

Polyethylene wax having a molecular weight between about 1,000 and 5,000 is preferred as the encapsulating material. Other polyolefin waxes may be used, e.g., polypropylene wax of molecular weight about 1,000 – 7,000, waxy copolymers of ethylene and propylene, ethylene and butylene and the like. Such materials and their method of manufacture are described, for example, in U.S. Pat. Nos. 2,928,797; 2,999,856; 3,060,163 and 3,066,038, which are incorporated for such disclosure herein by reference.

Procedures for encapsulation of lead chromate pigments in accordance with the invention may be broadly described as follows:

I. A "melt in" method in which pigment is uniformly mixed with molten wax, the mixture is solidified and then pulverized.

II. An emulsion coating method.

III. A wax in solvent solution coating method.

IV. A vapor coating method in which wax is applied by vacuum deposition or equivalent application of wax-containing vapors.

Any of these methods may be performed in a batch or continuous manner. Method I is particularly useful for continuous operation, offers excellent temperature control for the operation, and permits maximum ratio of wax to pigment to be attained. All the methods are capable of producing pigments that have improved color stability when compounded with thermoplastics as compared to known silica-coated lead chromate pigments (see U.S. Pat. No. 3,370,971, column 7, lines 32–52). Methods II and III can be conducted at ambient temperatures or elevated temperatures if desired, e.g., 20°–100° C. Methods I and IV should be operated at elevated temperatures sufficient to melt the polyolefin wax, e.g., about 100°–200° C. depending upon molecular weight of the wax, etc.

For method III, any suitable solvent for the polyolefin wax may be used which is relatively volatile, i.e., has a normal boiling point below about 150° C. Examples of useful solvents include hexane, benzene, toluene, tetrachloroethane, perchloroethylene, chlorobenzene and the like. Solutions containing one–50 parts of polyolefin wax per 100 parts solvent, and especially 10–30 parts wax, are advantageously used.

For Method II, suitable emulsions of either the O/W or W/O type may be prepared by procedures known in the art of using a variety of available emulsifying agents, e.g., see "Detergents and Emulsifiers" published annually by John W. McCutcheon, Inc., Morristown, N.J. 07960, the disclosures of which are incorporated herein by reference.

CONCLUSION

There has been described new methods for manufacture of lead chromate pigments based on the discovery that encapsulation of such pigments in polyolefin wax substantially improves their heat stability and abrasion resistance. Such encapsulation mitigates the degradation of tinctoral qualities of the silica-coated lead chromate pigments even when compounded with hard thermoplastic resin powders and provides improved pigments useful in coloring of thermoplastic resin molding compositions.

The embodiments of the invention in which an exclusive property or right is claimed are defined as follows:

1. A method for manufacture of lead chromate pigments having good abrasion resistance and color stability which comprises (1) depositing on the pigment particles a coating of silica that amounts to between about five to 50 percent of the total combined weight of pigment and silica, (2) encapsulating the silica coated pigment particles in polyolefin wax, the amount of said wax being between about 10 to 70 percent of the total weight of the product and (3) recovering lead chromate pigment in the form of individual particles each having a coating of said polyolefin wax overlaying said silica coating.

2. A lead chromate pigment having good abrasion resistance and color stability suitable for use in coloring of thermoplastic resins consisting essentially of (a) individual lead chromate pigment particles, (b) a surface coating of silica upon each of said particles in an amount between about five to 50 percent of the total combined weight of pigment and silica and (c) a layer of polyolefin wax on each of said particles encapsulating the silica coated particles, said polyolefin wax amounting to between about 10 to 70 percent of the total weight of pigment, silica and wax.

3. The pigment of claim 2 wherein the pigment particles are at least small enough to pass a 40 mesh standard screen.

4. The method of claim 1 wherein said encapsulation step 2 is accomplished by homogeneously mixing together the silica coated pigment of step 1 with molten polyolefin wax, cooling the resulting mix to a solid mass and pulverizing the mass.

5. The method of claim 1 wherein said encapsulation step 2 is accomplished by forming a slurry in water of the silica coated pigment of step 1, mixing an emulsion of polyolefin wax in water with said slurry, acidifying the emulsion and slurry mixture to coagulate the emulsion, separating the suspended solids of the acidified mixture by filtration from the liquid phase, washing the filtered solids and then drying them.

6. The method of claim 1 wherein said silica deposition step 1, is accomplished by simultaneously mixing together an aqueous slurry of lead chromate pigment, an aqueous solution of sodium silicate and an aqueous acid solution containing sufficient hydrogen ions to convert the sodium silicate into silica whereby silica is uniformly precipitated upon the pigment particles and then separating the solids from the resulting slurry by filtration.

7. The method of claim 6 wherein said acid solution consists of sulfuric acid dissolved in water.

8. The method of claim 6 wherein said simultaneous mixing is preformed by adding streamwise the aqueous sodium silicate solution and the acid solution to the aqueous slurry of lead chromate pigment while the slurry is continuously stirred and heated to a temperature between about 60° and 100° C.

9. The method of claim 8 wherein the resulting mixture is filtered after the completion of said streamwise additions, the filtercake is washed, air dried, further dried by heating to between about 70°–90° C and then pulverized.

10. A method for manufacture of lead chromate pigments having good abrasion resistance and color stability which comprises (1) depositing on the pigment particles a coating of silica that amounts to between about five to 50 percent of the total combined weight of pigment and silica, (2) encapsulating the silica coated pigment particles with polyolefin wax so the amount of wax is between 10 to 70 percent of the total weight of the product by vapor deposition of polyolefin wax upon the individual silica coated pigment particles obtained in step (1), and (3) recovering lead chromate pigment in the form of individual particles each having a coating of said polyolefin wax overlaying said silica coating.

11. A method for manufacture of lead chromate pigments having good abrasion resistance and color stability which comprises (1) depositing on the pigment particles a coating of silica that amounts to between about five to 50 percent of the total combined weight of pigment and silica, (2) encapsulating the silica coated pigment particles with polyolefin wax so the amount of wax is between 10 to 70 percent of the total weight of the product by mixing together the silica coated pigment particles of step (1) with a solution of polyolefin wax in an organic solvent followed by evaporation of the solvent from the resulting slurry, and (3) recovering lead chromate pigment in the form of individual particles each having a coating of said polyolefin wax overlaying said silica coating.

* * * * *